(12) United States Patent
Casden

(10) Patent No.: US 6,285,295 B1
(45) Date of Patent: *Sep. 4, 2001

(54) PASSIVE REMOTE PROGRAMMER FOR INDUCTION TYPE RFID READERS

(76) Inventor: Martin S. Casden, 4245 Meadowlark Dr., Calabasas, CA (US) 91302

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/212,583

(22) Filed: Dec. 14, 1998

(51) Int. Cl.$^7$ .................................................. G05B 19/02
(52) U.S. Cl. ...................... 340/825.22; 340/10.3; 341/176; 342/42
(58) Field of Search ............................ 342/42; 340/572.1, 340/10.3, 825.69, 825.31, 825.22; 341/176

(56) References Cited

U.S. PATENT DOCUMENTS

| | | | |
|---|---|---|---|
| 3,733,861 | * | 5/1973 | Lester ................................ 340/825.31 |
| 4,067,011 | * | 1/1978 | Althaus ................................ 340/10.3 |
| 5,355,513 | * | 10/1994 | Clarke ................................ 340/10.3 |
| 5,461,385 | * | 10/1995 | Armstrong ............................ 342/42 |
| 5,602,536 | * | 2/1997 | Henderson ...................... 340/825.31 |
| 5,748,106 | * | 5/1998 | Shoenian .............................. 340/10.3 |
| 5,940,007 | * | 8/1999 | Brinkmeyer ..................... 340/825.31 |

* cited by examiner

*Primary Examiner*—Brian Zimmerman
(74) *Attorney, Agent, or Firm*—Natan Esptein; Beehler & Pavitt

(57) ABSTRACT

A hand held passive remote programmer for Radio Frequency Identification readers has a keyboard for turning on any one of several RFID transponder tags in the programmer. Each transponder of the programmer is recognizable by the RFID reader as a program instruction which modifies the operation of the reader, rather than one of a second population of transponder tags which are recognized simply by proximity to the reader, such as tags provided in key cards. In a broader sense, the invention provides a method for wireless linkage of a keypad to an induction type RFID reader.

12 Claims, 1 Drawing Sheet

PASSIVE REMOTE PROGRAMMER FOR INDUCTION TYPE RFID READERS

BACKGROUND OF THE INVENTION

1. Field of the Invention

This invention relates generally of the field of radio frequency identification (RFID) systems and devices intended to sense the presence of a transponder tag within a sensing field of a reader unit and to read an identification code unique to each such tag thereby to identify a person or object associated with the tag. More particularly this invention is directed to a passive remote programmer for reprogramming microprocessor controlled induction type RFID readers.

2. State of the Prior Art

Radio frequency identification systems have come into widespread usage in a wide range of applications. One such application is controlling access to restricted areas of buildings or plant facilities by authorized personnel while excluding those lacking the necessary authorization. Most such proximity systems consist of a transponder, a reader and a host computer. The reader generates a radio frequency (usually in the 125 kHz or 13.5 MHz range). The transponder usually consists of an antenna circuit (tuned to the same frequency as the output of the reader) and an integrated circuit (IC). Sufficient energy to activate the IC is obtained via induction when the transponder is placed within the field of the reader. The frequency of the reader is also used as a clock for the IC. When energized, the transponder IC loads the antenna circuit of the transponder in a pattern determined by the design and programming of the IC. The loading of the transponder antenna is detected as a pattern of voltage changes on the reader's antenna circuit. The changes are converted into logical data bits using standard decoding methods and the data is then interpreted by the host and appropriate action (such as opening the door) is taken.

The topology of the various systems can range from a stand alone single door unit that contains the reader and the host in one small box mounted adjacent to a passageway to a complex system consisting of thousands of readers and other input/output devices connected to a communications network controlled by hundreds of host computers (running specialize software) that control access, personnel and property movement, lighting, HVAC, fuel dispensing and other functions. In stand alone, single door, products and in some systems with distributed intelligence, the reader and host are often combined into a single entity.

SecuraKey, a division of Soundcraft, Inc., the assignee of this invention sells a reader under the name Radio Key® 600 or RK600, described in their commercial literature as a "stand alone proximity/keypad access control system" which has a built-in programmer. This reader is of the inductive type and is intended to function in conjunction with key tags, also sold by the same assignee, which are passive bi-directional transponders in that power for the key tag is derived from the electromagnetic field generated by the reader. Each transponder consists of an integrated circuit and an antenna coil, both embedded in a small plastic token or tag. The integrated circuit of the transponder tag is a TEMIC e5550 contactless R/W-Identification IC (IDIC®) device sold by the semiconductor division of TEMIC TELEFUNKEN microelectronic GmbH, P.O.B. 3535, D-74025 Heilbronn, Germany.

There is a need for periodically reprogramming such proximity systems as authorized personnel and access control requirements change. For example, as newly authorized individuals are issued transponder tags, the new tags must be entered into the reader's programmed data base in order to be recognized when presented to the reader. Likewise, tags need to be removed from the data base as personnel leaves or is reassigned. In large RFID systems such reprogramming is typically done through the host computer linked to multiple readers. In smaller systems or those lacking centralized control, reprogramming may need to be done at each reader. Conventionally, this may be achieved through a keyboard provided on the reader unit itself, as in the aforementioned RK600 reader. It is often desirable to provide means for remotely programming the reader for convenience or security reasons. Radio frequency linked hand held remote programmers are available for this purpose. Such units typically include a keyboard connected to a microprocessor which delivers programming data transmitted via a low power radio frequency carrier generated by the programmer unit. Also available are passive programmers which draw their operating power from the electromagnetic field emitted by the reader. Existing passive programmers, however, are based on microprocessors or other complex circuitry . Also, the power requirements of these existing units is relatively large which results in a rather short operating range because the programmer must be brought sufficiently close to the reader where the field strength is adequate for powering the programmer. A continuing need exists for simpler, lower cost passive programmers, particularly for use with small or stand alone RFID installations.

SUMMARY OF THE INVENTION

This invention addresses the aforementioned need by providing a simpler passive remote programmer for induction type RFID readers. The novel remote programmer is of economical design, requiring only three main components: a keypad, an antenna and a number of commercially available, low cost transponder tag integrated circuits. Each of the transponder tag ICs, when connected to the antenna by actuation of a key on the keypad, communicates with the RFID reader by loading down the magnetic field in the vicinity of the transmitter antenna of the reader in a pattern which the reader interprets and decodes as digital data.

More specifically, the passive remote programmer system of this invention is intended for use with an induction type RFID reader having radio frequency (RF) sensing means operatively connected to a digital processor, such as a microprocessor, for reading tag identification data of RFID transponder tags powered by a sensing field of the reader and for verifying the identification data against stored identification data thereby to recognize the presence of authorized tags.

The programmer which may be a hand held unit houses an antenna, such as a loop antenna, a number of dedicated RFID transponder tag integrated circuits each having a unique tag code, and a keyboard having a plurality of keys each selectively operable for connecting a corresponding one of the dedicated RFID transponder tag integrated circuits to the antenna thereby to inductively power the selected tag IC in the reader's sensing field and enable the unique tag code of the selected tag IC to be read by the RFID reader. The remote programmer operates in conjunction with programming of the reader's microprocessor for recognizing the unique tag codes of the dedicated tag ICs as new reader programming instructions. In most cases the reader program is also operative for retaining or storing in microprocessor memory the new program instructions for subsequent execution by the microprocessor. The new program instructions may, for example, comprise data for modifying a transponder tag data base accessible to the reader microprocessor for use in executing decision making algorithms such as granting or denying access upon reading a particular tag code.

In a broader sense, the present invention may be understood as a method for wireless linkage of a keypad to an induction type RFID reader, comprising the steps of providing a keyboard having one or more individually actuatable normally open switch keys, connecting each of the switch keys to a corresponding RFID transponder tag IC and an antenna such that closing a particular switch key places a corresponding transponder tag IC in operative connection with the antenna for inductively communicating a unique identification code of the tag IC to the RFID reader; and program means executable by a microprocessor in the RFID reader for recognizing the unique identification code of each tag IC connected to the keyboard thereby to recognize the reading of those tag ICs as representing the actuation of a key or switch rather than the conventional presentation of a proximity key tag to the reader. The reading of the unique identification code may be interpreted as a new program instruction for the microprocessor modifying existing programming, but in general elicits a response from the reader which is different from the response elicited by the reading of a conventionally presented access key tag such that the response of the RFID reader to conventionally presented RFID tags may be modified by actuation of keys of the remote programmer keyboard.

These and other features, improvements and advantages of the present invention will be better appreciated and understood by reference to the following detailed description taken in conjunction with the accompanying drawings.

DETAILED DESCRIPTION OF THE PREFERRED EMBODIMENT

Figure 1:
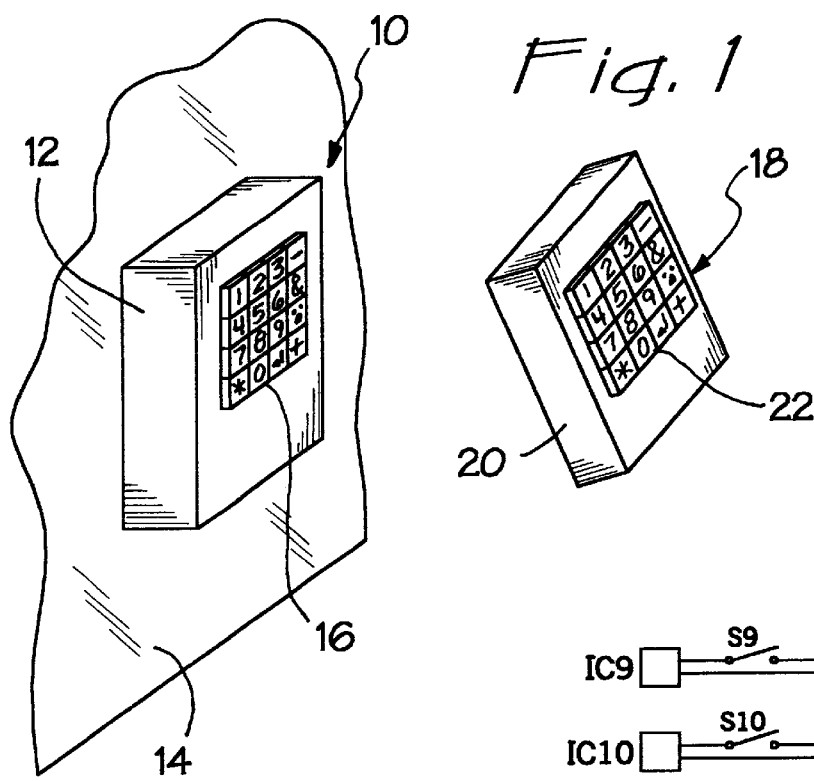
FIG. 1 is a perspective view illustrating a typical wall mounted RFID reader equipped with a keypad and a remote programmer according to this invention packaged as a hand held unit.

With reference to the accompanying drawings wherein similar elements are designated by similar numerals. FIG. 1 depicts a typical proximity RFID reader unit 10 contained in a reader housing 12 which is mounted on a wall surface 14. For purposes of this description the reader 10 may be an RK600 sold by SecuraKey equipped with an exteriorly mounted keypad 16 which provides an interface for accessing the reader's microprocessor control system. In most installations such access requires entry of an authorized passcode before the keyboard is enabled for reprogramming the reader unit. The keypad may also be used for entering a personal identification number (PIN) as an alternative to presentation of a key tag.

A passive remote programmer 18 according to this invention is shown having a housing 20 on which is mounted a keypad 22. The housing 20 may be a small enclosure sized for convenient hand held operation. The remote programmer's keypad may be a duplicate of the reader keypad 16, or may be configured differently.

Figure 2:
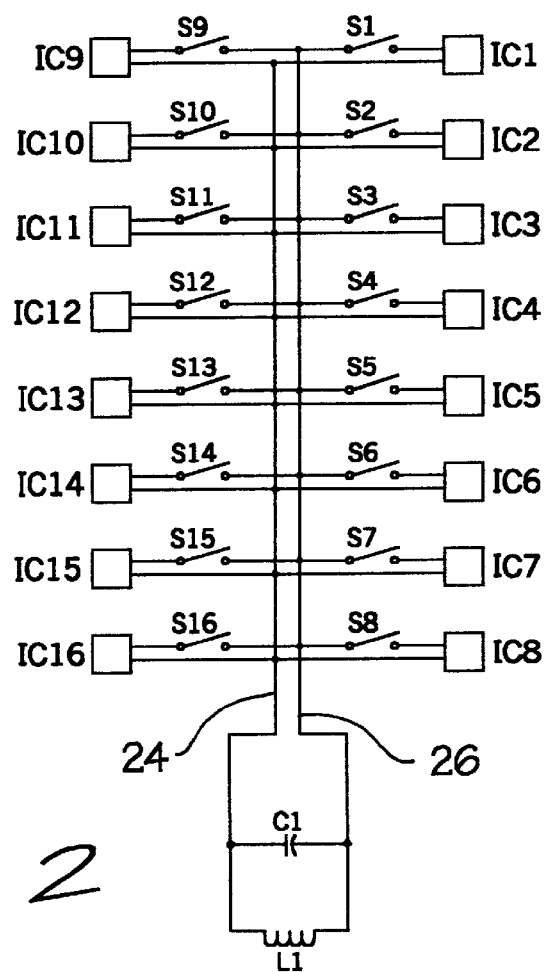
FIG. 2 is a circuit diagram of the novel remote programmer.

Turn now to FIG. 2 which shows a circuit diagram of the passive remote programmer 18. It will be appreciated that this circuit is quite simple and with few components. Switches S1 through S16 are normally open switches corresponding to sixteen keys arranged in a four-by-four matrix on the keypad 22. Integrated circuits IC1 through IC16 are sixteen similar transponder tag ICs each programmed to transmit a unique identification code when activated by the inductive sensing field of a proximity reader. The transponder IC's may be TEMIC e5550 devices which operate with the RK600 reader. Antenna coil L1 and capacitor C1 form an antenna tank circuit which is resonant at the transmitter frequency of the proximity reader. For example, L1 may be a 1.62 mH coil and C1 may have a value of 1000 pF. Each tag IC has two active terminals, one of which is connected directly to one side of the antenna tank circuit by means of bus line 24. The other active terminal of each tag IC is connected through a corresponding normally open switch S1–S16 to the other side of the antenna tank circuit by means of bus line 26. In a normal condition of the programmer all switches S1–S16 are open and none of IC1–IC16 are connected to the antenna circuit. Consequently, if the remote programmer unit 18 is placed in this condition within the sensing field of the reader unit 10, the programmer unit will not respond to the reader's sensing field. If, however any one of the keys on the keypad is pressed, closing one of switches S1–S16, the corresponding one of IC1–IC16 will have both of its active terminals operatively connected across the antenna tank circuit. In this condition, the operative IC will be powered up by energy inductively coupled from the reader to the antenna coil 1, and will transmit its unique tag code to the reader. The transponder IC may be in the form of surface mount dies and the entire circuit of FIG. 2 can be easily implemented on a single circuit board which can also carry the keypad and antenna coil. The resulting package is lightweight and rugged. The passive programmer disclosed herein improves over prior passive programmers not only in terms of greater simplicity and economy, but also in extended operating range from the proximity reader because the transponder tag ICs have lower power requirements than more complex passive programmers.

The program executed by the reader's microprocessor is written to recognize the unique tag codes of the programmer's transponder tag ICs IC1–IC16 as dedicated to a function other than ordinary access key tag data. In particular, the reader's program should recognize the reading of the dedicated tag codes as representing the actuation of a key rather than the presentation of a conventional key tag to the proximity reader. This recognition may be exploited by the programmer of the reader for any desired purpose. For example, keys corresponding to the digits 0 through 9 may each be represented by a particular and unique tag code, so that numerical data may be entered into the reader by pressing a sequence of keys. Logic function keys such as ADD or DELETE may be similarly represented by corresponding unique tag codes. Still other control functions, such as an ENTER key on the keyboard, may also be assigned corresponding tag codes. For example, the remote programmer may be used to add to or delete authorized key tags in the reader's data base, as by pressing a sequence of digits followed by pressing an ENTER key, or to enter PIN codes into the reader as an alternative to using the keypad 16 on the reader unit 10. In fact, the remote programmer can replace altogether the keypad on the reader with no sacrifice in programmability of the reader, resulting in a more secure installation since the keypad is no longer accessible on the reader. Also, elimination of the keypad makes it possible to better seal the reader enclosure or housing for better weather proofing and resistance to environmental contaminants.

The manner of programming the reader's microprocessor to accomplish such recognition will be apparent to those having ordinary knowledge of such systems and need not be described in greater detail here, particularly in view of the many ways in which proximity reader systems can be programmed both for conventional purposes and for purposes of implementing this invention. The programming which controls operation of the reader's microprocessor may be installed as firmware in non-volatile memory provided on the processor chip. Of course, other program storage devices may be provided for this purpose. For purposes of this invention, the reader control program should contain information to enable the reader to identify the unique ID code transmitted by the transponder tag ICs in the remote programmer so that these are distinguishable from other transponder tags not enabled by actuation of a key or switch, such as conventional key tags. This information is distinct from the data base which the microprocessor accesses in order to identify conventional key tags authorized for access. Recognition of key enabled transponder ICs permits programming of the reader to take special action in response to such tag IC readings, different from action taken in response to conventional tags which are enabled simply by sufficient proximity to the reader. From the preceding paragraph and the description generally it will be understood that this invention contemplates two distinct sets, groups or populations of transponder tags: a first population of dedicated tags associated with the remote programmer which to be enabled for recognition by the reader require both proximity to the reader as well as actuation of a key on the remote programmer, and a second population which are enabled by mere proximity to the reader. The transponder tags of the second population are recognized by the reader in a conventional manner, i.e. simply by being brought into sufficient proximity to the reader, and as explained earlier in the paragraph, the ID codes of these tags are recognizable from a data base accessible by the reader's microprocessor. The transponder tags of the first populations have ID codes which are different from those in the first population data base and are instead recognized by the reader's microprocessor as programming instructions which in some way control or modify the way in which the RFID reader responds to transponder tags of the second population. That is, the reader recognizes two different populations of tags and responds differently to tags from the two populations.

The number and functions of keypad keys which can be encoded and wirelessly linked to a reader in this fashion is virtually unlimited. As a practical matter, however, it may be found that this approach to passive remote programming is best suited to smaller keypads, while programmer units requiring large and complex keyboards are better implemented with microprocessor driven circuits or the like.

It should be understood that this invention is not restricted to any particular manufacturer's proximity systems, and is generally useful with any induction type proximity readers, provided that the tag ICs used in the remote programmer unit can be read by the target proximity reader.

While a particular embodiment of the invention has been described and illustrated for purposes of clarity and example, many changes, substitutions and modifications to the described embodiment will be apparent to those having ordinary skill in this technology without thereby departing from the scope of this invention as defined by the following claims.

What is claimed is:

1. A passive remote programmer system for an induction type RFID reader having RF sensing means operatively connected to a microprocessor for reading tag identification data of RFID transponder tags powered by a sensing field of the reader and for verifying said identification data against stored identification data thereby to recognize the presence of authorized tags, said programmer system comprising:

a hand held programmer unit housing an antenna, a plurality of dedicated RFID transponder tags each having a unique tag code, and a keypad having a plurality of keys each selectively operable for connecting a corresponding one of said dedicated RFID transponder tags to said antenna thereby to power the selected tag by induction in the said sensing field and enable the unique tag code of the selected tag to be read by the said RFID reader; and program means operative in cooperation with said microprocessor for executing a first action in response to recognition of tags presented through mere proximity to the reader in said sensing field, and a second action different from said first action in response to recognition of a said dedicated RFID transponder tag powered by operation of a key on said keypad, such that response of said RFID reader to said tags presented through mere proximity may be modified by operation of said keys on said keypad.

2. The passive programmer of claim 1 wherein said program means is also operative for interpreting the recognition of each said unique tag code as a new program instruction for execution by said microprocessor.

3. The passive programmer of claim 2 wherein said new program instruction comprises data for modifying a transponder tag data base accessible to said microprocessor for use in executing decision making algorithms under control of said program means.

4. The passive programmer of claim 1 wherein said keys are normally open switches.

5. The passive remote programmer system of claim 1 wherein said keys of said keypad are manually operated keys.

6. A method for wireless linkage of a keypad to an induction type RFID reader comprising the steps of:

providing a keypad having a plurality of manually operable switch keys;

connecting each of said switch keys to a corresponding RFID transponder tag and an antenna such that actuating each of said switch keys places a corresponding transponder tag in operative connection with said antenna for inductively transmitting a unique identification code of each tag to the RPID reader; and program means executable by microprocessor means in the RFID for recognizing said unique identification code of each tag connected to the keypad as representative of actuation of a particular key on said keypad and not indicative of the presentation of a key tag by mere proximity to the reader.

7. The method of claim 6 further comprising the step of executing program means by the reader associated with actuation of said particular key.

8. The method of claim 7 wherein said step of executing program means modifies the response of said reader to key tags presented by mere proximity to the reader.

9. An RFID system comprising:

an RFID reader having RF sensing means operatively connected to a microprocessor for reading RFID tags actuated by mere proximity to said RFID reader in a sensing field of said reader; and a programmer unit comprising an antenna, a plurality of dedicated RFID transponder tags each having a unique tag code, and a keypad having a plurality of keys each operable for connecting a corresponding one of said dedicated RFID transponder tags to said antenna thereby to power the selected dedicated RFID transponder tag by induction in said sensing field and enable reading of the unique tag code of the selected tag by the said RFID reader;

said microprocessor being programmed to respond to said reading of a said unique tag code in a manner different from its response to said reading of RFID tags actuated by mere proximity to the reader.

10. The RFID reader system of claim 9 wherein said programmer unit comprises a portable housing containing said antenna and said dedicated RFID transponder tags, and said keypad is mounted on said housing.

11. The RFID reader system of claims 9 wherein said microprocessor is programmed for executing an access control function in response to said reading of RFID tags actuated by mere proximity to the reader and to modify programming of said reader in response to said reading of a said unique tag code.

12. The RFID reader of claim 11 wherein the programming modified in response to said reading of a said unique tag code operates to modify the response of the reader to said reading of RFID tags actuated by mere proximity to the reader.

* * * * *